Nov. 10, 1959    R. B. HORSFALL    2,911,836
VARIABLE PRESSURE ANGLE CAM DRIVE
Filed Jan. 14, 1958    4 Sheets-Sheet 1

INVENTOR.
ROBERT B. HORSFALL
BY *Edward A. Sokolski*
AGENT

Nov. 10, 1959 R. B. HORSFALL 2,911,836
VARIABLE PRESSURE ANGLE CAM DRIVE
Filed Jan. 14, 1958 4 Sheets-Sheet 2

INVENTOR.
ROBERT B. HORSFALL
BY
AGENT

Nov. 10, 1959 R. B. HORSFALL 2,911,836
VARIABLE PRESSURE ANGLE CAM DRIVE
Filed Jan. 14, 1958 4 Sheets-Sheet 3
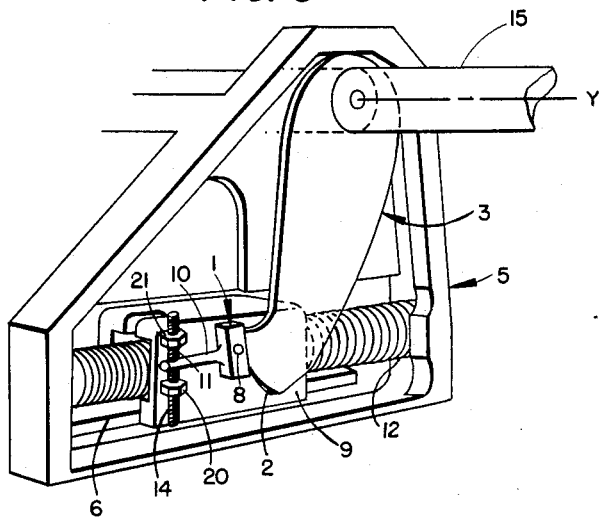
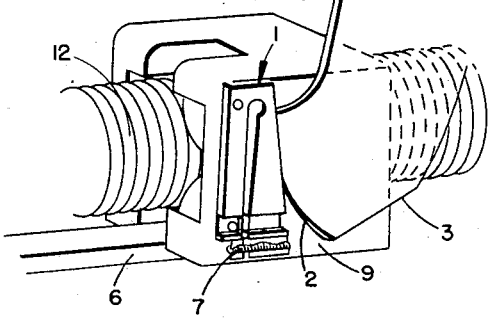
INVENTOR.
ROBERT B. HORSFALL
BY
AGENT Nov. 10, 1959  R. B. HORSFALL  2,911,836
VARIABLE PRESSURE ANGLE CAM DRIVE
Filed Jan. 14, 1958  4 Sheets-Sheet 4

INVENTOR.
ROBERT B. HORSFALL
BY
AGENT

United States Patent Office 2,911,836
Patented Nov. 10, 1959

2,911,836

VARIABLE PRESSURE ANGLE CAM DRIVE

Robert B. Horsfall, Whittier, Calif., assignor to North American Aviation, Inc.

Application January 14, 1958, Serial No. 708,870

8 Claims. (Cl. 74—89)

This invention relates to cam drives and more particularly to a cam drive in which the effective gear ratio can be adjusted by varying the pressure angle between the driving and the driven members. While this invention is not limited to involute cam drives and can be used with other types, its widest apparent application is with involute cams and therefore, this type is described in detail herein.

As is well-known in the art, an involute cam drive is useful in transferring linear motion to circular motion uniformly over wide arcs of travel. An involute cam is one having a contact surface in the shape of an involute curve. An involute curve is that traced by a perfectly flexible inextensible thread kept taut as wound or unwound from another curve called the evolute. In most applications where linear motion is transferred to circular motion, the evolute used is a circle. An evolute circle is commonly known as the base circle of the involute curve. To transfer linear motion to circular motion, a flat-faced member is used in coaction with the involute-shaped cam surface. If a flat-faced drive bar is used as the driving member, the normal to the flat-face at the point of contact with the came is tangential to the base circle. The gear ratio which is defined as the ratio of angular motion of the cam to corresponding linear motion of the drive member is a direct function of the radius of the base circle of the involute curve to which the cam surface is shaped. In precision applications where the gear ratio must be held to very close tolerances, it is essential that the radius of the base circle used to derive the involute curve be kept within extremely tight tolerances, if the flat-face of the drive member makes a non-variable predetermined angle with its direction of motion.

The device of this invention enables the adjustment of the gear ratio between the driving and driven members by varying this angle, or its complement, known as the pressure angle between the two. The pressure angle may thus be defined as the angle between a perpendicular to the direction of motion of the drive member and the flat surface of this bar. The device of this invention by enabling variation of gear ratio by changing the pressure angle lowers the tolerance requirements on the base circle radius of the involute to a point which makes the involute cam much more easily producible. For example, it has been found that a cam with a nominal 2.5" base circle radius need only be held to within .002" of this base circle radius for a particular precision application with an adjustable pressure angle while without utilization of the device of this invention the tolerance had to be held to within 20 microinches.

It is therefore an object of this invention to facilitate production of precision cam drives.

It is a further object of this invention to provide an improved cam drive.

It is still a further object of this invention to provide a cam drive with an adjustable gear ratio.

It is still another object of this invention to provide an involute cam drive wherein the pressure angle can be adjusted to vary the effective gear ratio.

It is a still further object of this invention to provide a precise involute cam drive without such stringent production tolerances as heretofore required.

Other objects of this invention will become apparent from the following description taken in connection with the accompanying drawings in which—

Fig. 1 includes a series of sketches illustrating the principles of operation of the invention;

Fig. 4 is an enlarged isometric drawing showing details of the drive bar and cam utilized in the embodiment shown in Fig. 2;

Fig. 5 is an isometric drawing of a second embodiment of the invention; and

Figure 1A:
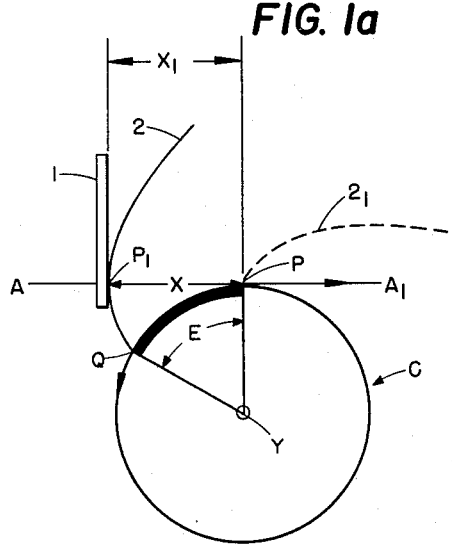
Figure 1B:
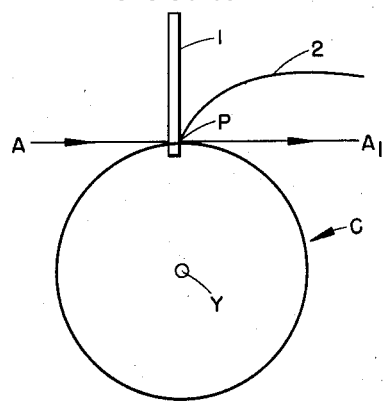
Figure 1C:
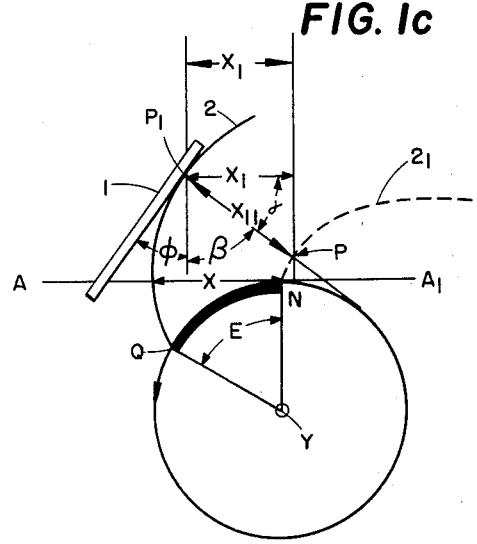
Figure 1D:
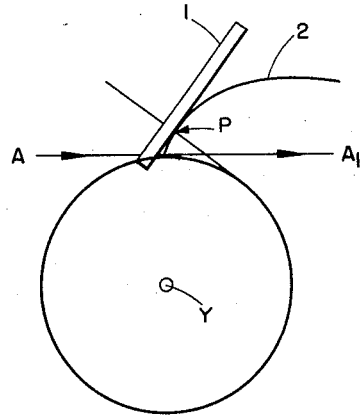

Referring to Fig. 1 which illustrates the principles of operation of the invention, sketches "$a$" and "$b$" show the operation of the device of the invention with zero pressure angle between the driving and the driven members. The drive bar 1 drives involute cam 2 by moving in direction A—A'. Sketch "$a$" shows the initial position while sketch "$b$" shows the position after motion through distance $X_1$. Y is the center of the base circle C and is also the axis of rotation of involute cam 2. The bar makes contact with the cam at point $P_1$ in the initial position and point P in the final position illustrated in sketches "$a$" and "$b$."

It can readily be seen that for motion of bar 1 through distance $X_1$ that this distance is proportional to the angular motion E of the cam shown in sketch "$a$." The arc PQ is equal to X which represents the section of the extensible thread unwound from this arc to generate the involute curve. X is equal to $X_1$. The pressure angle which is the angle between the contact surface of drive bar 1 and a line drawn perpendicular to the direction of motion is obviously equal to zero.

Referring now to sketches "$c$" and "$d$" which illustrate motion with a pressure angle between the driving and driven member equal to $\phi$, sketch "$c$" represents the initial position while sketch "$d$" represents the position after motion $X_1$ of the drive bar 1 in direction A—$A_1$. Distance X as before is represented equal to arc NQ which is proportional to the angular motion E of the cam 2. X is equal to $X_{11}$ which is also a segment of a tangent to the base circle intercepted between the involute curve in its initial position and its final position after motion $X_1$. That $X_{11}$ is equal to X can readily be seen as the involute curves 2 and $2_1$ having been generated from the same base circle are concentric with each other, and tangents to the base circle will intersect points on these curves successively equidistant from each other. Angle $\gamma$ is equal to angle $\phi$, both being complements of the angle $\beta$ (as can be seen, $X_{11}$ was constructed perpendicular to drive cam 1 at the cam contact surface $P_1$ and runs through contact point P). By simple trigonometry and substitution, it can be seen that $$\text{cosine } \gamma \text{ equals cosine } \phi \text{ equals } \frac{X_1}{X_{11}} \text{ equals } \frac{X_1}{X}$$

Therefore $X_1$, the motion in direction A—A' of drive bar 1 for angular motion E of the cam is equal to X cosine $\phi$. It can therefore be readily seen that as the pressure angle $\phi$ is varied, the amount of displacement $X_1$ of the drive bar 1 for a given angular motion E of cam 2 varies as the cosine of this angle $\phi$. The gear ratio will vary with the pressure angle as it takes less motion of the drive bar with a greater pressure angle for a given angular motion of the cam. The gear ratio for any pressure angle, $\phi$ is equal to the gear ratio at zero pressure angle multiplied by $$\frac{1}{\cos \phi}$$

or by sec $\phi$. In most applications, the pressure angle should be kept within about 20° to avoid disturbing forces normal to the direction of drive member motion. Where adjustments are to enable compensation to achieve precision requirements, allowances need only be made for a few degrees variation in pressure angle.

Figure 2:
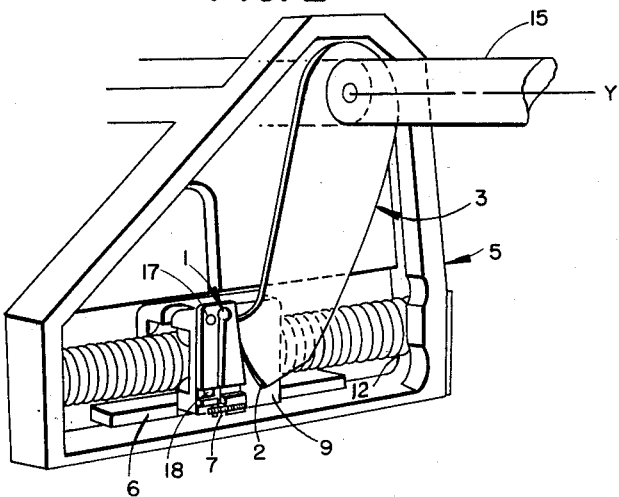
Fig. 2 is an isometric drawing of a first embodiment of the invention.
Figure 3:
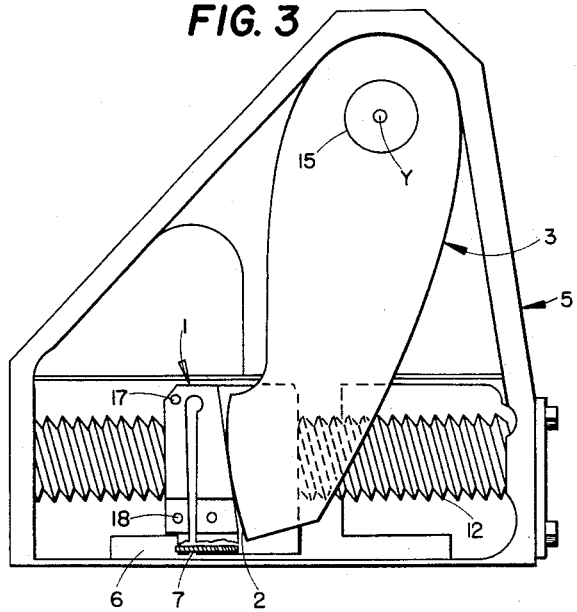
Fig. 3 is an elevation view of the embodiment shown in Fig. 2.

Referring now to Figs. 2, 3 and 4 illustrating a first embodiment of the invention, cam 3 is fixedly mounted on shaft 15 which provides output rotation. Shaft 15 rotates about axis Y which passes through the center of the base circle from which involute cam surface 2 has been generated. Cam surface 2 coacts with drive member 1, drive member 1 having a flat contact surface at the points of contact with cam surface 2. Drive member 1 is fixedly attached by mounting screws 17 and 18 to drive nut 9. Drive nut 9 is threaded to mate with drive screw 12 engaging therewith and is constrained from rotating by bar 6 fixedly attached to housing 5 and slidingly engaged in a key way in the nut 9. Drive screw 12 is rotatably mounted on housing 5 and may be driven by any suitable input drive means.

As drive screw 12 is rotated, nut 9 will move along bar 6. Drive member 1 will actuate cam 3 to give uniform rotational motion of output shaft 15 for a uniform linear motion of the nut and drive member.

Referring to Fig. 4, it can be seen that drive member 1 is bifurcal, having two arms whose separation may be adjusted by screw 7. The arm which does not contact cam surface 2 is fixedly attached to nut 9 by screws 17 and 18. Tightening of screw 7 will bring the free arm closer to the fixedly mounted one and thereby vary the pressure angle between the contact surface of the drive member 1 and the cam surface 2. In this manner the gear ratio can be effectively varied within the range of adjustment provided.

Fig. 5 illustrates a second embodiment of the invention in which the pressure angle is varied by changing the position of an arm 10 which is a part of the drive member, or is fixedly attached thereto. Drive member 1 is pivotally mounted at point 8. As can be seen, drive member 1 will pivot about an axis parallel to the rotation axis of cam 3. The end of arm 10 can be moved up and down and fixed in position by means of set screws 11 and 14 coacting with nuts 20 and 21 which are fixedly attached to the drive nut 9. In this manner the pressure angle between the contact surface of drive member 1 and the contact surface 2 of cam 3 can be varied to achieve the same end result as that achieved by the embodiment shown in Figs. 2, 3 and 4. This second embodiment provides a slightly greater range of adjustment than that shown in the first, but is a little more difficult to adjust and to fabricate.

It is to be noted that for precision applications, it is desirable to operate near zero pressure angle to avoid a disturbing force component normal to the direction of drive cam motion. However, as pointed out where requirements are not extremely stringent, the pressure angle can be varied up to about 20°.

It is obvious that means must be provided to load the driven member so as to remain in contact with the drive member throughout the motion. Such means may be gravitational action on an unbalanced mass, return spring, or the equivalent.

Figure 6:
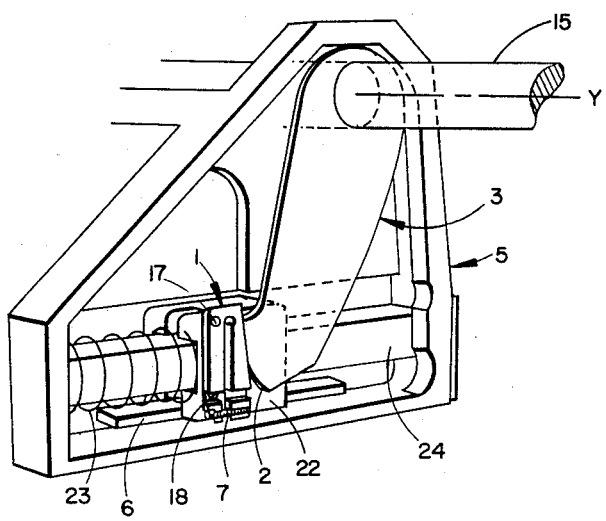
Fig. 6 is an isometric drawing of a third embodiment of the invention.

While the invention has been shown in the embodiment involving the involute cam as the driven member, it is a reversible mechanism, and an embodiment with an involute cam driving a linearly moving output member such as shown in Fig. 6 is equally possible. Here the slider 22 on which member 1 is mounted is driven along guide rail 24 which is fixedly mounted on housing 5 by the action of cam 3 when the arm 15 is rotated. Spring 23 is shown as one possible means for resiliently urging the slider 23 and consequently member 1 against the cam surface 2 since the cam will only apply force to the member 1 in one direction. Mounting screws 17 and 18 attach member 1 to slider 22 and adjustment screw 7 controls the pressure angle between the cam surface 2 and the contact surface on member 1. Thereby, as described for the other embodiments, the gear ratio between the cam 3 and the slider 22 may be varied by varying the pressure angle.

It will be readily appreciated that the principle of this invention can also be applied to an arrangement wherein the cam contacting surface of member 1 (Figs. 2, 3, 4 and 5) is fixed against rotation and variation of the pressure angle is effected by rotation of both nut 9 and screw 12 relative to housing 5.

This invention provides, as can be seen, a convenient way for adjusting the gear ratio in cam drives and thereby provides some flexibility in operation and means for compensating for a wider range of production errors. This is accomplished without any significant deterioration in the transfer of motion. The device of this invention is suitable for use in precision cam drives where even several seconds of arc error may be intolerable.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a cam drive, a drive member, a cam coacting with said drive member, and means for adjusting the pressure angle between said drive member and said cam, said pressure angle being maintained constant throughout the travel of said drive member and said cam whereby the effective gear ratio in said cam drive is variable as a function of the magnitude of said pressure angle.

2. The device recited in claim 1 wherein said cam has a drive member contact surface in the shape of an involute curve and said drive member has a flat cam contact surface.

3. In combination a driving member, a driven member engaged with said driving member, and means for adjusting the pressure angle between said driving and driven members, said pressure angle being maintained constant throughout the travel of said members whereby the effective gear ratio between said members is variable as a function of said pressure angle.

4. The combination recited in claim 3 wherein said members respectively comprise a cam having a drive surface in the shape of an involute curve and a member having a flat drive surface.

5. In a variable pressure angle cam drive, a cam having a contact surface with the shape of an involute curve of an evolute base circle, said cam being mounted for rotation about an axis coinciding with the center of said base circle, a member having a flat contact surface mounted for motion relative to said base circle, said flat contact surface coacting with said cam contact surface, means for driving said member and said cam concomitantly, and means for adjusting the pressure angle between said contact surfaces and thereby adjusting the effective gear ratio between said member and said cam.

6. The device recited in claim 5 in which said member has a bifurcal section and said means for adjusting the pressure angle comprises a screw threaded through the open end of said bifurcal section whereby the spacing between the arms of said bifurcal section can be varied.

7. The device recited in claim 5 wherein said member comprises a pivotally mounted section whereon said flat contact surface is located, said pivotally mounted section having a rotation axis parallel to said cam rotation axis, and an arm fixedly attached to said pivotally mounted section; and said means for adjusting the pressure angle comprises means for positioning said arm about the rotation axis of said pivotally mounted section.

8. A variable cam drive comprising a rotatably mounted cam, a member mounted for linear motion and having a flat surface operatively engaged with said cam, and means for varying the angle between said surface and the direction of said linear motion, said angle being adjusted to a predetermined setting which is maintained constant throughout the travel of said cam and said mounted member.

References Cited in the file of this patent

UNITED STATES PATENTS

| | | |
|---|---|---|
| 999,321 | Leach | Aug. 1, 1911 |
| 1,137,272 | Moyle | Apr. 27, 1915 |